US005181951A

United States Patent [19]
Cosse, Jr.

[11] Patent Number: 5,181,951
[45] Date of Patent: Jan. 26, 1993

[54] GRAVEL/FERTILIZER PACKET FOR POTTED PLANTS

[76] Inventor: Irvy E. Cosse, Jr., 4509 Gary Mikel, Metairie, La. 70002

[21] Appl. No.: 852,315

[22] Filed: Mar. 18, 1992

Related U.S. Application Data

[63] Continuation-in-part of Ser. No. 622,737, Dec. 5, 1990, abandoned.

[51] Int. Cl.⁵ .............................................. C05G 3/00
[52] U.S. Cl. ................................. 71/64.11; 71/64.13; 71/903; 71/904; 47/48.5; 47/81
[58] Field of Search ............... 47/48.5, 80, 81; 71/1, 71/64.11, 64.13, 903, 904

[56] References Cited

U.S. PATENT DOCUMENTS

| | | | |
|---|---|---|---|
| 1,554,865 | 9/1925 | Magoon | 71/64.11 |
| 1,988,307 | 1/1935 | Fay | 71/2 |
| 1,996,898 | 4/1935 | Brandell | 47/38 |
| 2,028,255 | 1/1936 | Steinbach | 47/38 |
| 2,222,815 | 11/1940 | Johnson | 71/64 |
| 2,649,196 | 8/1953 | Wayne et al. | 206/46 |
| 2,954,294 | 9/1960 | Whelan | 99/77.1 |
| 2,982,394 | 5/1961 | Novak | 206/46 |
| 3,059,379 | 10/1962 | Attoe | 47/48.5 |
| 3,352,226 | 11/1967 | Nelson | 99/295 |
| 3,987,584 | 10/1976 | Yellin | 47/37 R |
| 4,166,340 | 9/1979 | Pluenneke | 47/58 |
| 4,224,048 | 9/1980 | Pendergast | 71/11 |
| 4,539,038 | 9/1985 | Gombert | 71/64.11 |

FOREIGN PATENT DOCUMENTS

| | | | |
|---|---|---|---|
| 3827179 | 2/1990 | Fed. Rep. of Germany | 71/64.11 |
| 7301137 | 1/1973 | Japan | 71/64.11 |
| 8040008 | 3/1983 | Japan | 71/64.11 |

*Primary Examiner*—Ferris Lander
*Attorney, Agent, or Firm*—C. Emmett Pugh

[57] ABSTRACT

An apparatus and method for facilitating the extended infusion of fertilizer and controlled watering of a potted plant, while providing an improved method for preventing the egress of soil through the base of the pot, comprising a gravel/fertilizer packet, including a specially formulated fertilizer mixture, depending upon the type of plant, suspended in a gravel filtering base, the mixture being contained in an enveloping package comprised of a wicking, fluid permeable material, the package having emanating about its edge periphery a flange or skirt for facilitating the retention and controlled, even distribution of water and fertilizer and drainage of excess water. The present invention provides an easy, cost effective system for preparing a pot for planting, allowing the user to prepare the pot with fertilizer, a filtering medium for preventing the loss of soil, a wicking medium for fluid nourishment, and a water retention and drainage system all by the simple placement of the packet in the bottom of the pot prior to filling it with the planting soil.

2 Claims, 1 Drawing Sheet

GRAVEL/FERTILIZER PACKET FOR POTTED PLANTS

REFERENCE to RELATED APPLICATION

The present application is a continuation-in-part of patent application Serial No. 07/622,737 filed Dec. 5, 1990, which application is now abandoned.

BACKGROUND of INVENTION

1. Field of Invention

The present invention relates to accessories for plant containers including pots and the like, and more particularly to an apparatus and method for facilitating the extended infusion of fertilizer and controlled watering of a potted plant, while providing an improved means for preventing the loss of soil through the base of the pot.

The present invention teaches in its preferred embodiment a gravel/fertilizer packet comprising a specially formulated fertilizer mixture suspended in a gravel filtering base, the mixture being contained in an enveloping package comprised of a wicking, fluid permeable material, the package having emanating about its peripheral edge a flange or skirt for facilitating the retention and the controlled, even distribution of water and fertilizer.

The present invention in its preferred embodiment provides an easy, cost effective means of preparing a pot for planting, allowing the user to prepare the pot with fertilizer, a filtering fabric medium for preventing the loss of soil, a wicking medium for fluid nourishment and a water retention system, all by the simple placement of the present invention in the bottom of the pot prior to filling it with the planting soil. The gravel contained in the packet also allows drainage for the pot of any excess water that could cause root rot, while the fabric retains enough water to facilitate plant growth.

2. Prior Art and General Background

While the prior art has taught a variety of accessories for use in conjunction with the planting and maintenance of plants, none have contemplated the method or device of the present invention, the prior art being mostly limited to specific fertilizer only application embodiments.

A list of prior patents which may be of interest is presented below:

| Patent No. | Patentee(s) | Issue Date |
|---|---|---|
| 1,988,307 | T. Fay | 01/15/1935 |
| 1,996,898 | R. E. Brandell | 04/09/1935 |
| 2,028,255 | H. Steinbach | 01/21/1936 |
| 2,222,815 | R. O. Johnson | 11/26/1940 |
| 2,649,196 | Arney, Wayne et al | 08/18/1953 |
| 2,954,294 | J. P. Whelan | 09/27/1960 |
| 2,982,394 | Leo J. Novak | 05/02/1961 |
| 3,352,226 | S. E. Nelsen | 11/14/1967 |
| 3,987,584 | Bernard Yellin | 10/26/1976 |
| 4,166,340 | R. H. Pluenneke | 08/04/1979 |
| 4,224,048 | E. B. Pendergast | 09/23/1980 |
| 4,539,038 | J. M. Gombert | 09/03/1985 |

U.S. Pat. No. 4,166,340 to Pluenneke teaches the utilization of shredded, reclaimed tire fibers saturated with micro-nutrient fertilizer placed in the base of a pot over the drainage holes to prevent leakage of soil while providing nutrients for the plant.

U.S. Pat. 2,649,196 to Arny teaches a bag filled with a predetermined amount of fertilizer which is buried between rows of corn to slowly distribute the fertilizer in the soil and prevent soil from being washed out to the drainage holes.

U.S. Pat. 1,988,307 to Fay teaches a peat moss cake saturated with a fertilizer which is placed in the base of a flower pot to distribute the fertilizer to the soil and retain water from escaping out of the drainage holes.

U.S. Pat. No. 2,954,294 to Whelan and 3,352,226 to Nelson both teach infusion packages, such as the type used in coffee and tea filters, and is included for general information purposes.

As may be determined by a review of the above patents, the prior art does not teach nor contemplate a fertilizer packet of the type described herein for placement in the base of a plant pot.

3. General, Summary Discussion of the Invention

While the prior art has taught a variety of various types of fertilizer packaging for placement into the soil, none has contemplated a fertilizer pack comprising a specially formulated fertilizer and filtering medium contained by a configured package of fluid permeable fabric having wicking properties, the package further comprising a skirt or flange of the same material.

The present invention overcomes the above prior art problems by providing a system utilizing the above briefly described device, which is specifically formulated for the particular type of plant used therewith and sized to fit in the base of the desired pot for optimal performance.

In use, one merely selects the appropriately sized fertilizer pack for the pot being used, places the pack in the base of the pot with the skirt or flange extending up the inner sidewalls of the pot, fills the pot with potting soil or the like, and places the desired plant into the soil.

Upon watering the plant, the present invention serves five functions, namely 1) the cloth or fabric package, in conjunction with the gravel therein, acts as a filtering medium to prevent soil from being washed out of the pot; 2) the fertilizer contained in the package is "slow released," providing an extended infusion of nutrients to the plant which, after a transplant, is critical to the continued health of the plant; 3) the "skirt" or flange, in conjunction with the main body of the pack, acts to retain moisture, preventing all of the water from escaping through the drain holes; 4) the wicking action of the cloth of the package and "skirt" act to direct water from the base of the pot up the side walls of the pot, where the newly transplanted plant's root system will be able to receive the water; and 5) the gravel in the packet allows any excess water to drain from the pot, through the gravel and the pot through any holes in the pot.

It is thus an object of the present invention to provide a system for the potting of plants which provides for greater ease in preparing the pot and soil for transplanting of plants.

It is another object of the present invention to provide a device for use in the potting of plants, with the device preferably providing fertilizer, drainage, a filtering medium, a means to retain water, and a wicking medium in an inexpensive and easily used package.

It is a further object of the present invention to provide a device for use in the potting of plants, which is placed into the base of the pot prior to planting, with the device preventing the egress or loss of soil from the drain holes of the pot, while at the same time promoting appropriate drainage.

It is still a further object of the present invention to provide a fertilizer pack for use in potting plants or like activity, with the fertilizer pack containing an extended release fertilizer mixture preferably designed to promote optimal growth for the particular type of plant being used therewith.

Lastly, it is an object of the present invention to provide a fertilizer pack for use in the potting of plants which is available in a variety of size, packet and skirt configurations, whose use is dependent upon the size and shape of the pot being used therewith.

BRIEF DESCRIPTION of the DRAWINGS

For a further understanding of the nature and objects of the present invention, reference should be had to the following detailed description, taken in conjunction with the accompanying drawings, in which like parts are given like reference numerals, and wherein.

Figure 1:
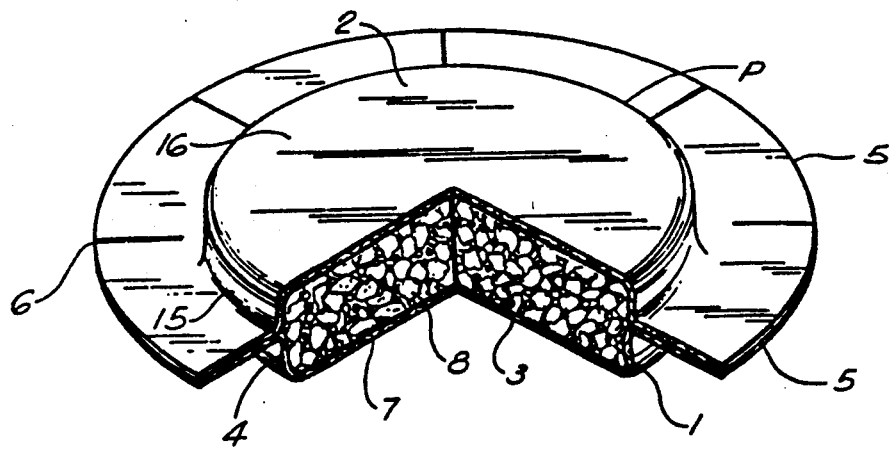
FIG. 1 is an isometric, partially cross-sectional view of the preferred, exemplary embodiment of the gravel/fertilizer packet of the present invention.

DETAILED DESCRIPTION of the PREFERRED, EXEMPLARY EMBODIMENT

As can be seen in Figures and 3, the gravel/fertilizer packet P of the preferred, exemplary embodiment of the present invention comprises an outer containing package 16 of cloth or the like. The outer fabric package 16 of the preferred, exemplary embodiment comprises a somewhat configured, main body 1 having an upper, first wall 2, a lower, second wall 3, and an edge 4.

Emanating from the edge 4 about the periphery of the main body 1 is a skirt or flange S. The skirt S, as included in the preferred embodiment of the invention, is comprised of the first (2) and second (3) fabric walls forming the main body 1, which are affixed at the edge(s) 4 via sewing, heat fusion, glue, or like means. In the present, preferred embodiment, the edges 4 are sewn with thread.

As further shown in FIG. 1, the skirt S may have cuts or slits 6 made in a perpendicular or radial fashion relative to the main body 1, for facilitating accurate and correct placement of the skirt into the pot.

Figure 2:
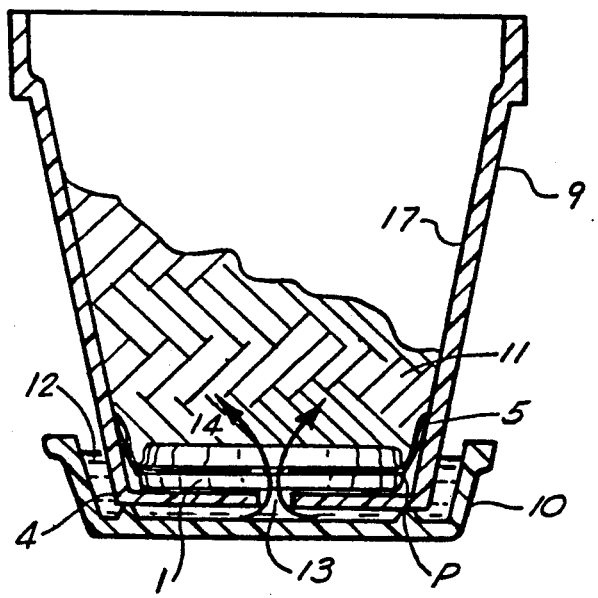
FIG. 2 is a side, partially cross-sectional, partially cut-away view of the preferred embodiment of the gravel/fertilizer packet of FIG. 1, illustrating its placement in a plant with potting soil, and the retention and migration of water through the packet fabric and skirt.
Figure 3:
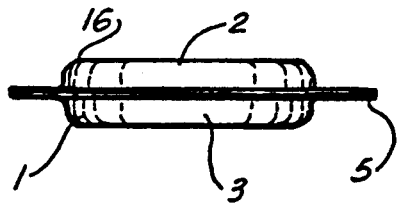
FIG. 3 is a side view of the gravel/fertilizer packet of FIG. 1.

As shown in the cut-away portion of the present FIGURE, first (2) and second (3) side walls are configured to envelope a mixture of gravel 7 and fertilizer 8. The gravel 7, in conjunction with the cloth composition of the walls 2, 3, acts as a filtering medium for the prevention of egress or loss of soil and the like from the plant pot during watering, as will be further explained infra FIG. 2 illustrates the placement and use of the exemplary embodiment of the present invention in a standard plant pot arrangement. As shown, the gravel/fertilizer packet P is placed in the base of pot 9 with the edge(s) 4 of main body 1 substantially communicates with, i.e. in juxtaposition or spaced relatively closely to, the inner side walls and bottom of pot 9, and the skirt 5 extends up along side and is in vertical communication with inner side wall of pot 17.

After placement of the gravel/fertilizer packet P in the base of the pot 9, the desired potting soil 11 is placed thereupon and the plant then transplanted to the pot. A watering dish 10 is desirable in the present system, as placing an amount of water 12 directly into the dish allows the infusion and retention of the water into the pot 9 by the gravel/fertilizer packet,s "wicking action" (note direction arrows 14), brought about by the cloth material of the first (2) and second (3) walls, while an optimal amount of fertilizer 8 is released through the main body 1 into the soil for use by the plant. Further, the skirt 5, in vertical communication with the inner side wall 17, is configured and designed to direct the water to the root system of the plant.

The water may be poured directly into the top of the pot as well, wherein it passes through the potting soil and through the filtering gravel into the dish 10, where it may be redirected into the pot when the soil and pack becomes sufficiently dry to promote infusion of the water back into the pot through the drain hole 13. Further, when the water is infused into the soil via the packet through the drain hole(s) 13, the fertilizer, contacting the water, gradually dissolves into the water, where it is directed up the side walls via the skirt to the plant.

The present device is contemplated to be offered in a variety of sizes and shapes, dependent upon the size of the pot with which it is to be used. Exemplary measurements of the exemplary embodiment(s) of the present invention are as follows (in inches) with "G" and "F" standing for gravel and fertilizer respectively:

| Diameter of Main Body | Thickness | Skirt | Pot Size (base) | Mixture* | Weight |
|---|---|---|---|---|---|
| 3" | ½" | 1" | 3" | 1 oz G, 1 oz F | 2 oz |
| 4½" | ⅝" | 1¼" | 4½" | 3 oz G, 2 oz F | 5 oz |
| 6½" | 11/16" | 1¼" | 6½" | 6 oz G, 4 oz F | 10 oz |
| 8½" | 1" | 1¼" | 8½" | 10 oz G, 6 oz F | 16 oz |

It is noted that the present invention may be configured to other sizes and shapes, depending upon the type of pot used therewith, and applicant does not intend to limit the present invention to the measurements and amounts set forth above.

The fertilizer used in the exemplary embodiment comprises OCHMITE TM 14-14-14 slow dissolving fertilizer mixture which, when used with the present system, is estimated to last approximately four to six (4-6) months under normal conditions. However, other slow-release fertilizers, such as HYPONEX TM, for example, may be substituted with similar good results, and special packs may be used incorporating specialty fertilizer for certain plants, such as rose bushes, vegetable and produce, and other flowers such as azaleas, camellias, and the like.

The gravel as used in the present system comprises fine to medium mixed "pea" type gravel, similar to that used in aquariums and the like.

The fabric or cloth as used in the exemplary embodiment of the present invention comprises 100% nonwoven RAYON TM synthetic fabric, which has been found to provide the desired wicking, fluid retention, and filtering properties as needed for the present invention, and is further desirable in that it is inexpensive, durable, and may be heat fused together, thereby foregoing the necessity for sewing the first (2) and second (3) walls of the present system together. As a more readily bio-degradable alternative, 100% cotton cloth may be used instead of the RAYON TM; however, because as such cloth is not heat-fusible, it would have to be joined via threaded or adhesive or other suitable means.

As previously stated, the skirt 5 of the gravel/fertilizer packet P may be slit at various areas 6 in perpendicular or radial fashion relative to the main body I in order to provide a flush fit with the inner sidewalls of the pot, although such slits may not be necessary.

In fabricating the present invention, the 100% exemplary RAYON TM fabric may be configured out of stacks of cloth via die cuts, providing a plurality of cloth pieces for assembling the exemplary embodiment. First and second pieces of cloth would be selected, the gravel/fertilizer mixture placed therebetween the centered, forming main body 1 and skirt 4, and the edges of the main body 1 would be fused, sewn, glued, or otherwise joined.

The embodiment(s) described herein in detail for exemplary purposes are of course subject to may different variations in structure, design, application and methodology. For example, the skirt of the present invention may vary from about a half ($\frac{1}{2}$") of an inch to over twelve (12") inches, depending upon the size of the pot used, while the diameter of the main body may vary anywhere from a half ($\frac{1}{2}$") inch to over ten (10") inches, again depending upon the size of the bottom of the pot.

Further, because many varying and different embodiments may be made within the scope of the inventive concept herein taught, and because many modifications may be made in the embodiment herein detailed in accordance with the descriptive requirements of the law, it is to be understood that the details herein are to be interpreted as illustrative and not in a limiting sense.

What is claimed is:

1. A method of providing a balanced moisture content to soil in a plant pot, the pot having a base with a drain hole therein and an interior sidewall, the method preventing the egress of the soil from the drain hole in the pot, while allowing the draining of excess water therethrough, the method further providing a wicked system for maintaining balanced moisture content in the soil, comprising the following steps:
   (a) providing a draining/wicking packet, said packet comprised of fluid permeable material, the material further having a fluid wicking characteristic, such as, for example, cotton, RAYON TM and the like, said draining/wicking packet further comprising:
      a main body including a first fluid permeable wall said main body having an edge; and
      a skirt emanating at least about a half an inch length from the edge of said main body;
   (b) providing a pot having an inner sidewall, and a base with a drain hole formed therein;
   (c) placing said draining/wicking packet into the base of said pot such that said skirt extends up in vertical fashion and communicates with the inner side wall, and said first wall of said main body communicates with the base of said pot;
   (d) placing soil into said pot atop said draining/wicking packet, such that said soil communicates with substantially the full length of said skirt of said packet;
   (e) planting a plant into said soil in said pot;
   (f) watering said plant;
   (g) allowing said water to drain through the soil and pass through said main body of said packet, filtering said soil from the water prior to passing through the drain hole of said pot;
   (h) absorbing a quantity of water through said first wall of said main body;
   (i) wicking the absorbed water through said first wall of said main body to said skirt;
   (m) wicking the absorbed water the length of said skirt; and
   (n) providing a quantity of the absorbed water from the skirt to the communicating soil.

2. A method of providing and maintaining a balanced nutrient and moisture content to soil in a plant pot, the pot having a base with a drain hole therein and an interior sidewall, the method preventing the egress of the soil from the drain hole in the pot, while allowing the draining of excess water therethrough, the method further providing a wicked, nutrient enhanced watering system for providing and maintaining balanced nutrient and moisture content in the soil, comprising the following steps:
   (a) providing a fertilizer/filter packet, said packet comprised of fluid permeable material, the material further having a fluid wicking characteristic, such as, for example, cotton, RAYON TM and the like, said draining/wicking packet further comprising:
      a main body including first and second, fluid permeable walls forming a top and a bottom, said first and second walls being configured to envelope a granular mixture of fertilizer, said first and second walls being joined together to form an edge; and
      a skirt emanating at least about a half inch length from the edge of said main body;
   (b) providing a pot having an inner sidewall, and a base with a drain hole formed therein;
   (c) placing said fertilizer/filter packet into the base of said pot such that said skirt extends up in vertical fashion and communicates with the inner side wall, and said first wall of said main body communicates with the base, of said pot;
   (d) placing soil into said pot atop said second wall of said fertilizer/filter packet, such that said soil communicates with substantially the full length of said skirt of said packet;
   (e) planting a plant into said soil in said pot;
   (f) watering said plant;
   (g) filtering said soil from the water prior to passing through the drain hole of said pot;
   (h) dissolving fertilizer from said gravel/fertilizer packet into the water, providing a nutrient rich water, wicking said nutrient rich water along the said skirt, communicating with said soil and distributing the nutrient rich water to said soil;
   (i) retaining an amount of the water in the first and second side walls of said main body and said skirt of said gravel/fertilizer packet;
   (j) providing drainage of excess water through the main body and the drain hole of the pot;
   (k) absorbing a quantity of water through said first wall of said main body, and into said main body, communicating the water to said fertilizer, providing a nutrient rich water;
   (1) wicking the nutrient rich water through said first wall of said main body to said skirt;
   (m) wicking the nutrient rich water the length of said skirt; and
   (n) providing a quantity of the nutrient rich water from the skirt to the communicating soil.

* * * * *